United States Patent
All et al.

(10) Patent No.: US 8,649,260 B2
(45) Date of Patent: Feb. 11, 2014

(54) SYSTEM AND METHOD FOR PROVIDING A STABLE AND TAMPER PROOF COMMUNICATION BETWEEN A VEHICLE, A VEHICLE RELATED UNIT, AND A REMOTE SYSTEM

(75) Inventors: Pontus All, Göteborg (SE); Jonas Thorngren, Göteborg (SE)

(73) Assignee: Volvo Technology Corporation, Göteborg (SE)

( * ) Notice: Subject to any disclaimer, the term of this patent is extended or adjusted under 35 U.S.C. 154(b) by 669 days.

(21) Appl. No.: 12/922,455

(22) PCT Filed: Mar. 14, 2008

(86) PCT No.: PCT/SE2008/000198
§ 371 (c)(1),
(2), (4) Date: Sep. 29, 2010

(87) PCT Pub. No.: WO2009/113919
PCT Pub. Date: Sep. 17, 2009

(65) Prior Publication Data
US 2011/0013510 A1    Jan. 20, 2011

(51) Int. Cl.
    *H04W 84/18*    (2009.01)
(52) U.S. Cl.
    USPC .......................... 370/225; 701/31.5
(58) Field of Classification Search
    USPC .......................... 370/225; 701/31.5
    See application file for complete search history.

(56) References Cited

U.S. PATENT DOCUMENTS

| 5,588,005 | A | 12/1996 | Ali et al. |
| 6,580,981 | B1 | 6/2003 | Masood et al. |
| 8,024,083 | B2 * | 9/2011 | Chenn ........................ 701/31.5 |
| 2006/0280129 | A1 | 12/2006 | Kline et al. |
| 2012/0053759 | A1 * | 3/2012 | Lowrey et al. .................... 701/2 |

FOREIGN PATENT DOCUMENTS

| EP | 0748084 A1 | 12/1996 |
| EP | 1821454 A1 | 8/2007 |
| WO | 2007047359 A2 | 4/2007 |

OTHER PUBLICATIONS

International Search Report for corresponding International Application PCT/SE2008/000198.
International Preliminary Report on Patentability for corresponding International Appplication PCT/SE2008/000198.
Supp. European Search Report (Feb. 20, 2013) for corresponding European App. 08 74 1828.

* cited by examiner

*Primary Examiner* — Melvin Marcelo
(74) *Attorney, Agent, or Firm* — WRB-IP LLP

(57) ABSTRACT

Systems and methods for providing a stable communication between a vehicle's on-board connectivity layer include at least one vehicle located communication node and at least one vehicle associatable communication node, and an off-board connectivity layer including at least one remote system located communication node, wherein each communication node communicates with at least one other communication node over a communication connection, and in case the communication connection to the at least one communication node is disturbed or interrupted, a communication connection to another communication node is established.

25 Claims, 4 Drawing Sheets

SYSTEM AND METHOD FOR PROVIDING A STABLE AND TAMPER PROOF COMMUNICATION BETWEEN A VEHICLE, A VEHICLE RELATED UNIT, AND A REMOTE SYSTEM

BACKGROUND AND SUMMARY

The present invention relates to a communication system and method for providing a stable and tamper proof communication between a vehicle (such as for instance a truck), a vehicle related unit (such as for instance a truck related unit, such as a trailer), and at least one remote system.

A vehicle according to an aspect of the invention can be every kind of vehicle which is adapted to trail a vehicle related unit, as for instance a truck or a tractor connected to a separate trailer, or which comprises two separated compartments, as for instance a rigid truck having a driver compartment and a storage compartment. The vehicle can also be e.g. a passenger car trailing a caravan, a boat or any other kind of trailer, or a bus with a trailer for skies or with an additional coach (trailer for passengers). Also construction equipments or agricultural equipments, like a tractor and separate equipment connected thereto, or even trains with coaches and wagons as vehicle related units, can be regarded as vehicle in the sense of an aspect of the invention. Moreover, a vehicle can also be a ship or boat (motor boat or sailing boat) both for commercial and leisure purposes with removable (vehicle related) units connected or associated thereto, as well as motorcycles or cycles with trailers.

In the following, an aspect of the invention will be described in more detail in connection with its application for trucks, without thereby limiting the invention in its scope of claimed protection. The man skilled in the art can easily apply aspects of the invention in other fields than trucks, for instance in the field of cars, buses or construction equipment, by following the description below.

From the state of the art, a plurality of truck-trailer communication systems and methods are known. For example, the US patent application US 2007/0149184, describes a communication method between a truck, a trailer and a remote system, wherein sensor data from sensors monitoring the conditions and states of the truck and/or the trailer are transmitted to a data centre, which process the received sensor data and in turn directs the processed data to the corresponding back offices of the truck, the trailer and even the cargo. The sensors themselves can be part of an onboard system of a truck and/or a trailer, and provide information on the conditions of the truck and the trailer, particularly on the location of them. In addition, sensors can be provided which monitor the condition of a cargo, e.g. the temperature of deep frozen cargo. The conditions monitored by the sensors can also include information on unauthorized access to, or unauthorized movement or unauthorized transportation of the truck, the trailer or the cargo. The information is collected and analyzed by processors of the data centre and, dependent on the result, a re-commanding, like the change of a route, or an adjustment of the temperature can be re-transmitted to the truck-trailer combination.

For transmitting the information, the truck comprises a transceiver which transmits information to and from the on-board system over a wireless communication network to and from the data centre. In case the trailer is parked in a depot or distribution centre, the sensors of the trailer are directly connectable to a distribution centre management system for providing data on trailer locations or states.

The main disadvantage of this system and method is that for transmitting the information to the remote data centre, the information are centrally collected and transmitted by a main transceiver. In case the main transceiver is broken—intentionally, e.g. by a tamper or theft attempt, or unintentionally, e.g. due to wear or by accident,—the information cannot be transmitted to the remote data centre any more.

It is desirable to provide a stable and tamper proof communication system and method between a vehicle, such as a truck, at least one vehicle related unit, particularly a truck-related unit such as a trailer, and at least one remote system which is still operable, even if a default communication line is disturbed.

According to an aspect of the invention, a communication between a vehicle, at least one vehicle related unit and at least one remote system is established by providing a communication between a vehicle's on-board connectivity layer comprising at least one vehicle located communication node and at least one vehicle associatable communication node (a "vehicle associatable communication node" being defined as a communication node that is adapted to be associated with a vehicle), and an off-board connectivity layer comprising at least one remote system located communication node. The establishment of communication possibilities between each communication node of on-board and off-board connectivity layer provides a stable a tamper proof communication system and method, since, even if a communication connection is disturbed or interrupted, the system and the method, respectively, is enabled to used another communication connection as "by-pass" communication connection. For this purpose each communication node comprises a routing unit which is adapted to establish and route a "by-pass" communication connection to at least one other communication node in order to provide the communication connection between the communication nodes.

In the following the description will solely focus on its preferred application to trucks and truck related units for easier understanding. Nevertheless, the scope of the claims is not intended to be limited thereby. The truck related unit can be e.g. at least one trailer, whereby a truck-trailer-combination is formed, but it is also possible that a storage compartment of a rigid truck is regarded as truck related unit.

A connectivity layer according to an aspect of the invention may comprise a plurality of electronic and electric devices which are interconnectable via communication nodes and can exchange any kind of data. E.g. the truck's on-board connectivity layer can comprise all integral (=constantly connectable or built-in) and/or nomadic (=part-time connectable or removable) devices which are based on or are associatable to a truck.

An integral device based on a truck can be e.g. a truck's telematics system, a truck's on-board system, a truck's sensor network or any other truck component, such as a truck's storage compartment or a truck's engine. A nomadic system based on a truck can be e.g. a trailer or a mobile phone which is connectable to the truck's telematics system. An integral system associatable to the truck can be e.g. a trailer's/cargo's on-board system and/or a trailer's/cargo's telematics system and/or a trailer's/cargo's sensor network. However, also the storage compartment of a rigid truck, as well as a driver and driver related devices can be regarded as truck associatable units, wherein the storage compartment could be regarded as integral and the driver as nomadic device associatable to the truck. A device regardable as integral as well as nomadic device associatable to a truck can be e.g. a fifth wheel control unit having a fifth wheel connection sensor.

Ordinarily, telematics or on-board systems comprise a plurality of electronic and electric devices which are interconnected by wired connections such as a CAN bus ("Controller Area Network", a network protocol common in the automotive industry) or a token bus, and/or wireless connections, such as Bluetooth (an industrial specification for wireless personal area networks) or infrared, or by ad-hoc connections such as a ZigBee system (a wireless standard designed for small and low-powered components). The telematics or on-board system can also include a complete sensor network or part of it, but the sensor network itself can also be regarded an independent on-board system. In general, the sensor system provides data on the state or the condition of the truck and/or the trailer and/or the cargo. For example, the sensors can sense, among others, tire pressure or cargo temperature or open/closed doors.

To each telematics or on-board system one or a plurality of nomadic systems (systems which are not constantly connected or not constantly incorporated to/in the system), can be connected. A nomadic system is for example a driver's mobile phone or PDA ("Personal Digital Assistant"). But also trailer and/or cargo can be regarded as nomadic system to the truck, since they are not constantly connected to the truck. Each nomadic system also comprises communication nodes which can establish a communication to the telematics or on-board system or any corresponding remote system.

Integral and/or nomadic devices themselves can also comprise a plurality of sub-integral and sub-nomadic devices. E.g. a driver's mobile phone or handheld computer can be regarded as sub-nomadic device to the nomadic device "driver", or a cargo can be regarded either as sub-integral or sub-nomadic device to the integral/nomadic device "trailer". Nevertheless, the classification as integral, sub-integral, nomadic or sub-nomadic is not sharp, since units can likewise be regarded as integral or nomadic depending on the specific circumstances of the individual application in or for which they are used or supposed to be used and/or the context of the situation in which they are used or supposed to be used. The above stated examples should only show the variety of formation possibilities for the on-board connectivity layer.

The same variety applies to the off-board communication layer. It can also comprise a plurality of different kinds of remote systems. In a common sense, the off-board connectivity layer corresponding to the truck's on-board connectivity layer comprises a truck's, and/or a trailer's and/or a cargo's back office system. In addition, the off-board connectivity layer can also include—among others—an end user's (customer's) back office, a security call centre and/or an emergency call centre.

In the following the truck associatable unit is exemplarily embodied as trailer for easier reading and understanding of an aspect of the invention's principle. Further, it should be clear from the above description that each part of the on-board and off-board connectivity layer can also comprise a plurality of communication nodes.

A communication node in the sense of an aspect of the invention is any device which is able to transmit and receive data of any kind. For example a modem having an antenna is a communication node, but also an interface like a serial port can be regarded as communication node. Each communication node further comprises a routing unit for establishing and routing a communication connection to at least one other communication node, i.e. the routing unit enables the communication node to transmit and receive data. Such a routing unit can be a common router, bridge, switch, hub or gateway, but also any other electronic or electric device which can provide a communication to another device.

The communication connections can be unidirectional, i.e. a communication node can only transmit or receive a message or data, whereby a one way communication is established, or bi-directional, i.e. a communication node can transmit and receive messages or data, whereby a two way communication is established or any combination thereof. It is also possible that a bi-directional communication between a communication node A and a communication node B is established in such a manner that a message or data transmitted from communication node A to communication node B is directed over a third communication node C, whereby the communication connection over communication node C is unidirectional, and a message or data transmitted from communication node B to communication node A is directly transmitted. It is clear for a person skilled in the art that more than a third communication node C can be involved and also that the message or data transmitted from communication node B to communication node A can be sent via further unidirectional or bidirectional communication nodes.

Additionally, the routing unit can route messages or data according to different routing schemes. For instance the routing unit can transmit data according to a unicast or a multicast or a broadcast or an anycast routing scheme. A unicast routing scheme is routing scheme, wherein the data are transmitted to a single destination communication node. In contrast to that, the terms broadcast or multicast describe the transmission of data to a plurality of destination communication nodes, wherein broadcast and multicast differ in so far that broadcasting describes the transmission to all available destination communication nodes, wherein for a multicast routing scheme, the routing unit selects at least two destination communication nodes from a plurality of destination communication nodes. An anycast routing scheme describes a scenario, whereby data is routed to the "nearest" or "best" destination communication node(s) as viewed by the routing unit.

Preferably, the routing unit selects the routing scheme to be used depended on the message or data which shall be transmitted. For example in case an emergency message needs to be transmitted, the routing unit can select a broadcast, multicast or anycast routing scheme, whereby the message is transmitted to a plurality of destination communication nodes. It is also possible that such a message is transmitted without defining a destination communication node at all.

In the following an aspect of the invention is described more in detail in connection with bidirectional communication connections between communication nodes. However, it is clear for the man skilled in the art that this shall not be seen as limitation of the invention which is also usable in applications where unidirectional communication connections between communication nodes are used instead or combinations of unidirectional and bi-directional communication connections.

Communication between the communication nodes is performed via established (exemplarily bi-directional) communication connections e.g. between a communication node located in the truck and a communication node located in the trailer, the truck's communication node and a communication node located in a truck's remote system, and the trailer's communication node and the remote system's communication node. Or, as a further preferred embodiment shows, between the communication nodes of the truck and the trailer, the truck and a truck's remote system, the trailer and a trailer's remote system, and the truck's and the trailer's remote systems. In general, a remote system can be a part of a back office system for the truck, trailer and/or cargo management, but also an emergency call centre, such as a police station, and/or a security call centre, like a security company, and/or one or more end users.

In case an established bi-directional communication connection is disturbed, e.g. an antenna is broken or a server used for the connection to a remote system is overloaded, the inventive system and method is enabled to establish and route a connection to and/or over another communication node. That means, for example, if the antenna of the truck is broken, the truck cannot communicate with the remote system any more, i.e. the bi-directional communication connection between truck and remote system is disturbed. Then, according to an aspect of the invention, the truck can use the connection to the trailer and subsequently the connection of the trailer to the remote system for transmitting and/or receiving data.

According to a further embodiment, instead of using an already existing communication connection, each communication node is enabled to establish a further communication connection to a further available communication node. For example, as shown in a preferred embodiment, a communication node detection unit can be provided, which detects further available communication nodes to which the routing unit can establish and route a communication. Such a further available communication node can be e.g. a mobile phone of the driver.

If the remote systems, to which the trailer and/or other parts of the on-board connectivity layer are connected, differ from the remote system the truck is connected to, a communication connection between communication nodes incorporated in the different remote systems are provided. Thereby, it is ensured that data, addressed e.g. to the remote system connected to the truck, are received by this remote system, even if the communication is re-directed e.g. over the trailer's communication node to the trailer's remote system and from there to the truck's remote system.

According to a further preferred embodiment, the communication node can determine a default connection to another communication node. That means, for example, in the simplest connection model, where the trailer, the truck and a single remote system are connected, that data addressed from the truck to the remote system can be transmitted directly to the remote system or via the trailer. The communication node of the truck then determines that data addressed to the remote system should, by default, be transmitted directly to the communication node of the remote system and not over the communication node of the trailer.

In a further preferred embodiment, the communication node can receive and/or transmit data on a disturbed connection or disturbed connections. For example, in case the truck-trailer combination is involved in a highway robbery and the criminals try to destroy the truck's antenna in order to cut off the truck-trailer combination from any communication to a remote system such as an emergency centre or security centre, the inventive system and the inventive method can, preferably automatically, provide a communication to the remote system by using any available communication node to forward the information on the disturbed communication connection or to forward an alarm message.

It is also preferred that the information on a disturbed or destroyed communication connection is transmitted to all communication nodes available to the communication node having a destroyed or disturbed connection, and from there forwarded to other communication nodes, whereby the information on a disturbed or destroyed connection is snowballed.

As further preferred embodiments show, the connection between the communication nodes of the on-board and off-board connectivity layers can be provided by wireless communication connections such as satellite based communication, and/or connections through GPRS ("General Packet Radio Service", a data transfer service for data transfer in kilobytes available in a cellular communication system), UMTS ("Universal Mobile Telecommunications System"—is one of the third-generation cell phone technologies. Currently, the most common form of UMTS uses W-CDMA ("Wideband Code Division Multiple Access") as the underlying air interface, standardized by the third generation Partnership Project—a collaboration between groups of telecommunications associations, to make a globally applicable third generation mobile phone system, —and is the standard European system corresponding to the requirements for third generation cellular radio systems) and/or CDMA ("Code Division Multiple Access"—a hybrid 2.5G/3G protocol of mobile telecommunications standards). It is also possible to use CB ("Citizen Band") radio service or any other radio service. Preferably, the inventive system and the inventive method use different wireless communication connection, particularly different to the disturbed communication connection, in order to provide a communication even if the cause for the disturbed communication connection is jammed or disabled by a third party.

Since all available communication nodes are interconnected and even further communication nodes can be integrated into the inventive system, data can be transmitted over all established connections to almost all communication nodes. Thereby, the inventive system and method provide a stable and tamper proof communication between the communication nodes of and within the on-board and off-board connectivity layers.

Further advantages and preferred embodiments are defined in the subclaims, the description and/or the figures.

BRIEF DESCRIPTION OF THE DRAWINGS

In the following aspects of the invention will be described by reference to embodiments shown in the appending figures. The embodiments are exemplary, only, and are not intended to restrict the scope of the claimed invention, as defined by the claims.

The figures show.

DETAILED DESCRIPTION

Figure 1:
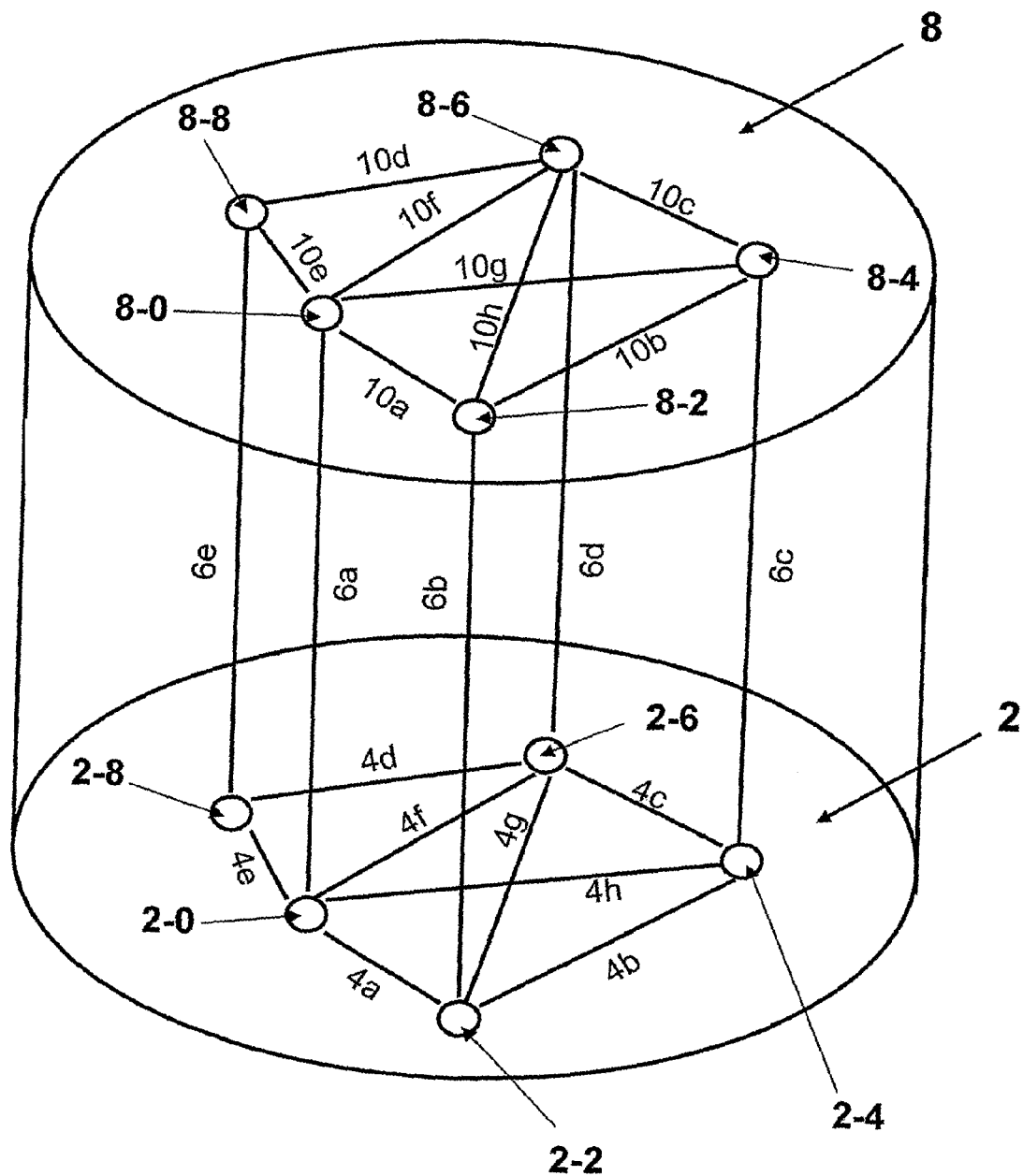
FIG. 1: a schematic illustration of the operation mode of a preferred embodiment of the inventive system.

FIG. 1 shows an illustration of an operation mode of a preferred embodiment of the inventive system. The preferred embodiment shows five communication nodes 2-0, 2-2, 2-4, 2-6, and 2-8 establishing a truck's on-board connectivity layer 2. The on-board connectivity layer 2 does not necessarily refer to a realistic on-board system but describes all integral and/or nomadic devices and/or systems which are based on or are associatable to a truck, e.g. a trailer, a cargo, a driver, a fifth wheel and their corresponding devices and systems like telematics systems, on-board systems, sensor networks, a mobile phone or a handheld computer.

Figure 2:
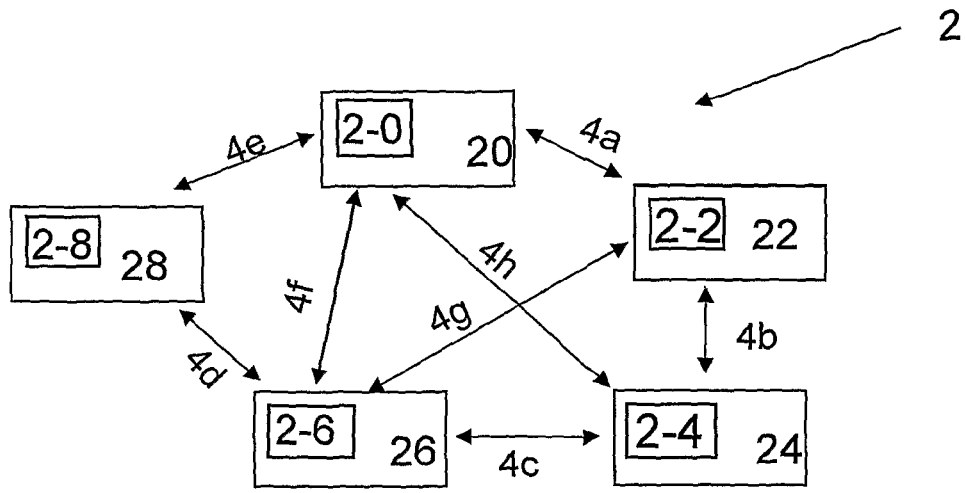
FIG. 2: a schematic illustration of a further preferred embodiment of a communication between communication nodes within an on-board connectivity layer.

FIG. 2 shows a preferred embodiment of such an on-board connectivity layer 2. The illustrated on-board connectivity layer 2 comprises a truck telematics system 20, such as a truck's on-board system and sensor network having a communication node 2-0, a trailer telematics system 22 having a communication node 2-2, a cargo telematics system 24 having a communication node 2-4, a driver handheld device 28 having a communication node 2-8 and a sensor 26 sensing a connection on a fifth wheel having a communication node 2-6. It goes without saying that each part of the on-board connectivity layer 2 can comprise more than one communication node and can comprises a plurality of integral and nomadic devices each having additional communication nodes.

As can be seen in FIG. 1 and FIG. 2, the communication nodes 2-0 to 2-8 are interconnected by communication connections 4a-4h, whereby a "horizontal" communication network between the parts of the on-board connectivity layer is established. Each communication connection can be supported by a variety of wireless and/or wired communication protocols and technologies, e.g. Bluetooth, Zigbee, Wimax ("Worldwide Interoperability for Microwave Access", a telecommunications technology aimed at providing wireless data over long distances), CAN, Ethernet (the most common communication standard for local area networks). Furthermore, a sensor network can also in itself constitute a telematics-to-telematics-communication link.

Figure 3:
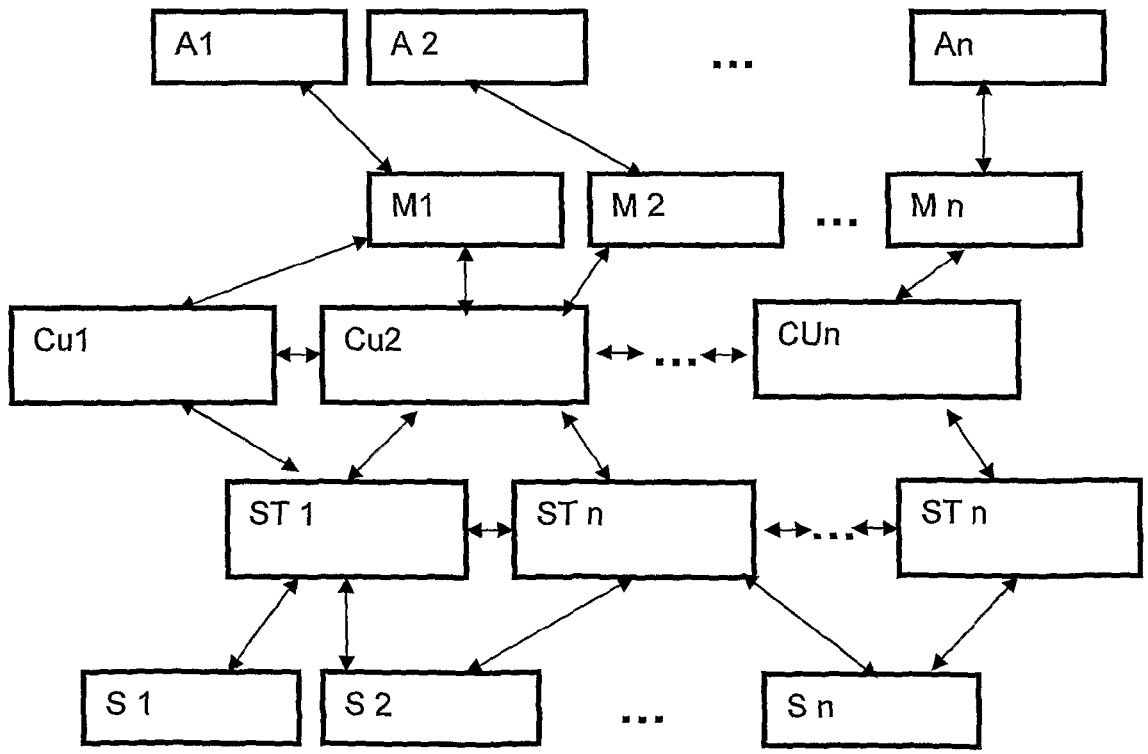
FIG. 3: a schematic illustration of an exemplary telematics system.

An exemplary truck telematics system 20 is illustrated in FIG. 3. In general, telematics systems for vehicles or vehicle parts (e.g. trailer, cargo) may be used for a number of purposes, including tracking fleet vehicle locations, i.e. monitoring the location, movements, status and behaviour of a vehicle, fleet of vehicles, trailers, or cargos, recovering stolen vehicles or vehicle parts, providing automatic tamper attempt notification or providing location-driven driver information services. Vehicle telematics systems can also be used to provide remote diagnostics, that means a vehicle's on-board system may identify a mechanical or electronic problem or monitor vehicle states (e.g. the temperature of a cargo), and the telematics can automatically make this information known to the vehicle remote system such as a company's back office. Telematics systems comprise electronic, electromechanical, and electromagnetic devices operating in conjunction with computer controlled devices and transceivers. They may comprise ear safety systems and self-contained integral electromechanical sensors.

The exemplary truck telematics system 20 shown in FIG. 3 comprises el plurality of sensors 81-Sn connected to one or more sensor data transceivers 8T1-STn (e.g. a vehicle ECU ("Electronic Control Unit"), driver display, etc). Each sensor 81-Sn may contain functions to communicate whether it has been triggered or tampered with, and is enabled to continuously pall and transmit its status. Each sensor data transceiver ST1-STn can communicate with one or many control units CU1-CUn in multiple ways. Furthermore, each sensor data transceiver 8T1-STn can communicate with other sensor data transceivers STn-ST1 and forward data destined to other transceivers or control units. Each connection can have encryption and authentication mechanisms built in. Control units CU1-CUn can have multiple modems M1-Mn attached to and are capable of communicating with one or many other control units CU1-CUn and sensor data transceivers ST1-STn on the same or different physical entities (e.g. truck and trailer). Each modem M1-Mn is connected to at least one antenna A1-An for providing a vertical communication connection to at least one remote system (not shown). The illustrated communication connections (double arrows) are exemplary, only, and it goes without saying that up to all parts of the telematics system can be horizontally interconnected with each other.

FIG. 1 further shows, that, in addition to the horizontal connections 4a-4h, each communication node 2-0 to 2-8 has at least one "vertical" communication connection 6a-6e, which may be provided by antennas A1-An shown in FIG. 3. The vertical communication connection 6a to 6e can be provided by a wireless communication system e.g. by satellite or cellular communication, like UMTS, CDMA, GPRS. But also other radio services, such as CB radio service, can be used. In a preferred embodiment, the vertical communication connections 6a to 6e differ from each other. That means, e.g. communication connection 6a is a cellular communication connection operated at 400 MHz, wherein the communication connection 6c is operated on 1800 MHz. but it is also possible that the communication node can provide dual, tri, quad band etc. cellular communication connection.

The vertical communication connections 6a to 6e provide a communication to an off-board connectivity layer 8, I.e. to the remote systems communication nodes 8-0 to 8-8 to corresponding to the parts of the on-board connectivity layer 2. These nodes are related to corresponding remote systems 80-88 as exemplarily depicted in FIG. 4. Such remote systems 80-88 are e.g. the trucks company back office 80, a fleet management back office (not shown), a trailer's owner back office 82, a cargos owner back office 84, a drivers' management back office 88, or an emergency call centre (not shown).

Figure 4:
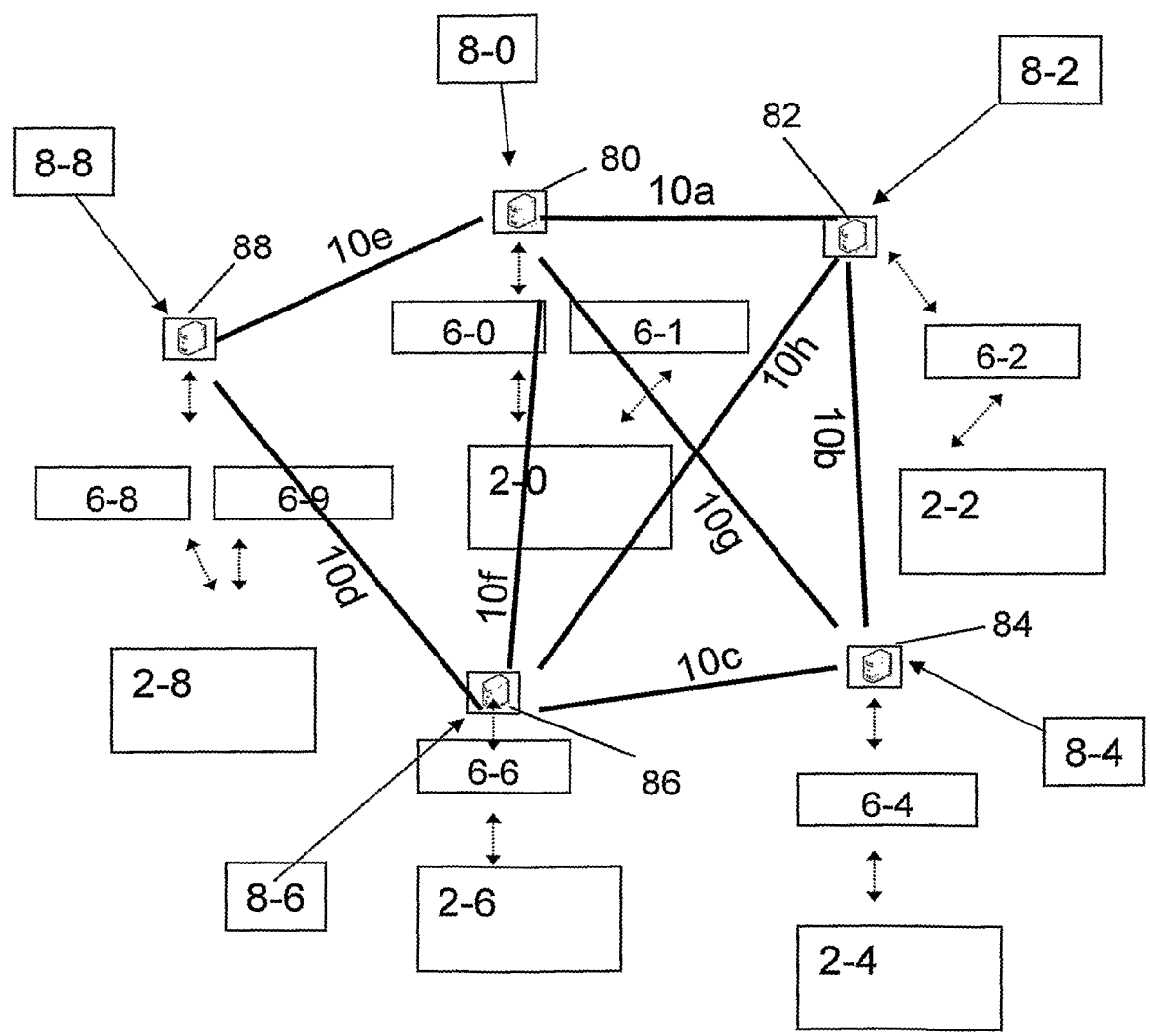
FIG. 4: a schematic illustration of a preferred embodiment of a communication between communication nodes of the on-board connectivity layer shown in FIG. 2 and communication nodes of an off-board connectivity layer.

As can be seen in the embodiment shown in FIG. 4, the communication nodes 2-0 of the truck's telematics system 20 and the communication node 2-8 of the driver's handheld device 28 can establish a satellite 6a1, 6e1 and a cellular 6a2, 6e2 communication connection to the communication nodes 8-0, 8-8 of their corresponding back offices 80, 88. The communication nodes 2-2, 2-4 and 2-6 of trailer telematics system 22, cargo telematics system 24. and fifth wheel sensor 26 are only provided with satellite communication possibilities 6b, 6c and cellular communication possibilities 6d, respectively.

Each remote system 80 to 88 comprises at least one communication node 8-0 to 8-8. The remote system can be e.g. a truck's 80, a trailers 82 or a cargo's 84 management server, or also a security company. As can be seen in FIGS. 1 and 4, the communication nodes 8-0 to 8-8 of the remote systems are also interconnected by "horizontal" connections 10a-10h, whereby the off-board connectivity layer 8 is established. Since the remote systems 80-88 are mostly stationary, the connections can be provided by wired communication e.g. intranet or internet, but it is also possible to use wireless communication connections.

Each communication node 2-0 to 2-8 and 8-0 to 8-8 can comprise a routing unit (not shown) which routes data to be transmitted from one communication node to another. For that, default communication connections dependent on data addresses can be determined. That means e.g. that the truck's communication node 2-0 determines that data addressed to the truck's back office are transmitted via communication connection 6a directly to the truck's back office communication node 8-0. Data addressed to the trailer in turn are transmitted via connection 4a.

Since a plurality of different and loosely connected entities can be a part of a moving vehicle, the configuration of on-board connectivity layer and off board connectivity layer can change—even during transport. Parts of the truck-trailer combination can either join or leave, whereby also different remote systems may be involved (e.g. a cargo is delivered or picked up). The driver, truck, container, cargo, trailer, fifth wheel, etc, can all be equipped with on-hoard units or nomadic devices that can be a part of the on-board connectivity layer. Therefore, an initial system establishment method can be performed so that all of these communication nodes in on-board systems or nomadic devices can connect and communicate. The initial system establishment method can be performed once at a manufacturer side and is then established as default. But it is also possible that the method is automatically performed or manually initialized each time the vehicle starts or a change in the configuration of on-board and/or off-board connectivity layer is detected. After the system establishment each communication node is able to forward data from one communication node to another, whereby the inventive system is able to cope with a variety of issues and requirements, for instance a communication of node failures.

Additionally, since, the connectivity layer and its nodes and integral and nomadic units can change over the time, the status of the connectivity layer can be checked from time to time and can be updated if necessary. Additionally, the check can take into account whether the change is authorized or not authorized. An authorized change is e.g. a change in the layer which is authorized by the rightful and authorized person or entity and therefore acceptable/accepted (for example a trailer is disconnected from the truck at the fleet owner's building or the cargo is unloaded at a supermarket or the driver is going home), and the change in the connectivity layer is not authorized, for example, if the trailer is stolen or the cargo is illegally removed from the trailer.

In a preferred embodiment, the availability of certain nodes and the availability of the complete system can be checked and verified by forwarding control tokens or by similar ping-mechanisms at certain intervals, or on a per event basis. Dependent on the result of the check, the system can detect events, such as joining of nodes and leaving of nodes, and the system can accommodate these changes. The possibility to detect changes of the connected nodes or their statuses, leads to the capability to distinguish between an authorized and non-authorized disconnection of a node (e.g. decoupling of a trailer leads to an unconnected trailer communication node). For example, the configuration of the system after the check can be compared to the last configuration of the system which has been approved as authorized. In case they differ and the change is not confirmed by an authorized person or entity, the system can report a non-authorized change.

A preferred embodiment of the establishment of the inventive system will be described for a simple exemplary embodiment of the inventive system with reference to FIG. 5. The described embodiment of the inventive system has an on-board connectivity layer comprising of a truck telematics system 20 having a communication node 2-0 and a trailer telematics system 22 having a communication node 2-2. Truck and trailer communication nodes 2-0 and 2-2 are connected to communication nodes 8-0, 8-2 of a truck's back office 80 and trailer's back office 82, respectively, whereby the truck's back office 80 and the trailer's back office 82 form the off-board connectivity layer 8. The back office systems 80, 82 and truck 20 and trailer 22 are also horizontally interconnected via communication nodes 8-0, 8-2 and 2-0, 2-2, respectively.

Figure 5:
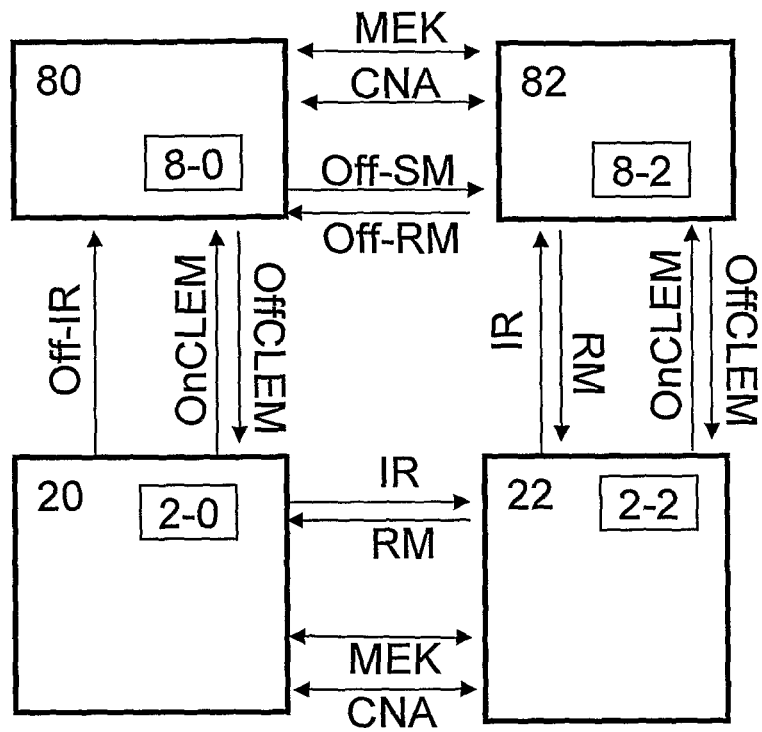
FIG. 5: a flow diagram of a preferred embodiment of an establishment operation for communication connections in a preferred embodiment of the inventive system.

Next, with reference to FIG. 5 a preferred embodiment of a method for establishing the inventive system is described. This exemplary method is based on the step of establishing an on-board connectivity layer, which ensures that data usually transmitted e.g. by the truck to the truck's back office can also be transmitted via the trailer. The step of establishing an on-board connectivity layer may comprise the following three main steps:

Transmitting by means of an initializing communication node an Invitation Request ("IR") for forming an on-board connectivity layer to all communication nodes;
—Re-transmitting a Response Message ("RM") comprising information on an acceptance of the Invitation Request ("IR") to the initializing communication node; and Transmitting an On-board Connectivity Layer Established Message ("On-CLEM") from all on-board communication nodes to their off-board communication nodes.

After this, an optional encryption keys exchange step can be performed.

For performing the method, one communication node can serve as initializing communication node. In the present embodiment the initializing communication node is the truck's communication node 2-0. But each other communication node can also serve as initializing communication node.

For performing the first main step, the initializing communication node 2-0 can e.g. transmit a horizontal Invitation Request IR to all other on-board connectivity layer communication nodes, i.e. to the communication node 2-2 of the trailer telematics system 22. All communication nodes of the on-board connectivity layer 2 then vertically transmit the Invitation Request IR to the remote systems connectivity layer 8 comprising their corresponding own back offices, i.e. to the communication node 8-2 of the trailer's back office 82.

For the next main step, each remote system, in the illustrated case the back office 82, confirms receipt and acceptance of the Invitation Request IR by retransmitting a Response Message RM to the initializing communication node 2-0 of the truck telematics system 20 via their corresponding on-board connectivity layer communication node, i.e. the communication node 2-2 of the trailer telematics system 22.

The Response Message RM can also comprise information on the communication node address of the corresponding remote system and/or of the corresponding communication node in the on-board connectivity layer, such as an IP ("Internet Protocol") address or another network address. Such an address is a unique address that certain electronic devices currently use in order to identify and communicate with each other on any kind of network. By providing the initializing communication node with this information, e.g. with the network address of the trailer's back office, the initializing communication node can directly communicate e.g. with the trailer's back office.

In the third main step, the On-Board Connectivity Layer Established Message OnCLEM is transmitted from all on-board nodes to the corresponding off-board node, informing the communication nodes of the remote systems of the on-board connectivity layer.

In case there is more than one remote system it is preferred to also enable a communication between the communication nodes of the remote systems, whereby the off-board connectivity layer is established. For that, the initializing communication node 2-0 can also transmit an Off-board Invitation Request ("Off-IR") to its own back office, i.e. the communication node 8-0 of the truck's back office 80, comprising information on those other back offices, i.e. here in FIG. 5 the trailer's back office 82, which have send back the response message RM. The communication node 8-0 of the truck's back office 80 then establishes a communication connection to the communication node 8-2 of the trailer's back office 82 by transmitting an off-board Communication Setup Message ("Off-SM") and receiving a corresponding Response Message ("Off-RM").

All back offices 80, 82 then transmit an Off-board Connectivity Layer Established Message ("OffCLEM") to their corresponding communication nodes 2-0, 2-2 in the on-board connectivity layer 2, informing the truck and trailer telematics systems 20, 22 on the established off-board connectivity layer between the back offices 80, 82.

Additionally, an exchange of Message Encryption Keys ("MEK") between the on-board connectivity layer parts, i.e. the truck telematics system 20 and the trailer telematics system 22, and the off-board connectivity layer parts i.e. truck's back office 80 and trailer's back office 82, can be performed. In case the network addresses are not included in the response messages RM, on-board and off-board connectivity layer parts can provide each other, in a further step, with their corresponding communication node addresses ("CNA"). Thereby, it is ensured that the truck telematics system 20 and/or the trailer telematics system 22 can transmit data to their back offices 80, 82 via the respective other telematics system 22, 20.

This communication establishment operation ensures that all communication nodes are horizontally and vertically connected with each other. Therefore, it is also possible that the communication nodes communicate status data not only to their corresponding remote system but also to each other, whereby they are enabled to mutually monitor their respective status. In case a communication node is disabled or down, the other communication nodes are informed and can provide and/or transmit the information on the disturbed connection and/or provide a communication connection to the remote system of the communication node having a disturbed connection.

Figure 6:
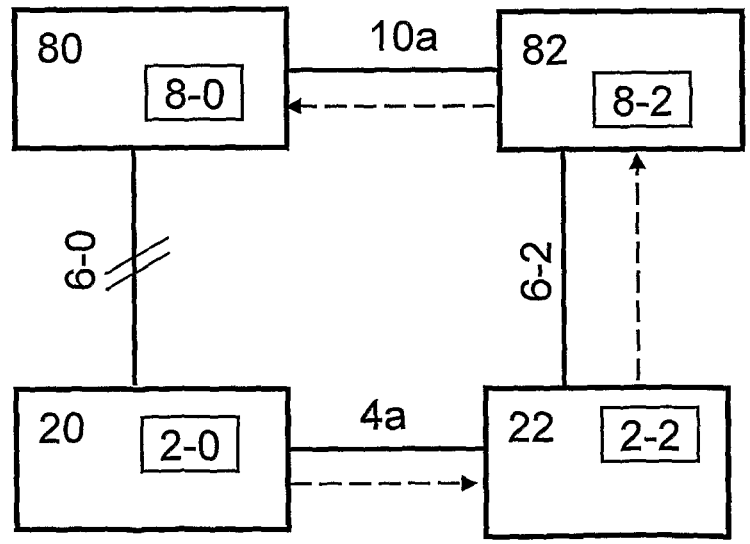
FIG. 6: a schematic illustration of a preferred embodiment of used communication connections in case a default communication connection is disturbed.

FIG. 6 shows the same exemplary simple embodiment as FIG. 5. As can be seen in FIG. 6 indicated by the double line, the communication connection 6a between the communication node 2-0 of the truck's telematics system 20 and the communication node 8-0 of the truck's back office 80 is disturbed. Such a disturbed connection can occur if e.g. the antenna of a truck is broken or damaged unintentionally or intentionally in a temper or theft attempt in communication systems according to the state of the art, a broken antenna leaves the truck with out any outside communication possibility, so that the police or the truck's back office can not be informed.

According to the inventive system, a disabled communication node does not mean that the whole system remains without any outsides contact. As explained above all communication nodes are interconnected, whereby a communication can be redirected over a different communication node and/or all communication nodes are informed on a disabled communication node, and can therefore automatically transmit an alarm message to e.g. an emergency call centre or to the truck's back office.

The information of the other communication nodes on a disabled communication node can be realised either by receiving and transmitting a corresponding message or by directly detecting the loss of a connections (in case the communication node is directly connected to the disabled communication node). That means all undisturbed communication nodes can transmit a message or information on the disturbed connection to their connected communication nodes, which in turn transmit the message to their connected communication nodes and so on. Thereby the message is snowballed with in the inventive system.

FIG. 6 shows that in case the communication connection 6a of the truck's telematics system 20 to its back office 80 is disturbed, the truck telematics system transmits a message to the trailer telematics system 22 via communication connection 4a. The trailer telematics system then forwards the message to its own back office, namely the trailer's back office 82, via communication connection 6b, wherein the trailer's back office in turn forwards the message to the truck's back office via communication connection 10a, whereby the truck's back office is informed of the disturbed connection and can provide countermeasures. The message transmitting path is indicated by dashed arrows in FIG. 6.

But it is also possible that in case the truck only comprises a single communication node which also provides the communication to the trailer, the trailer's telematics system can automatically generate a message to the truck's back office or to an emergency call centre upon detection of the loss of the connection to the truck.

The above described possibility to transmit data to destination communication nodes even if the default communication connection is disturbed makes the system less vulnerable to tamper or destruction attempts.

Of course every other system which is part of the inventive system can be used to transmit the message, for example a driver's mobile phone. But, it is also possible that in case a communication node is disabled, particularly as a result of a criminal offence, any other available communication node, e.g. a mobile phone of the criminal himself, can be used to transmit an alarm message.

The invention claimed is:

1. Method for providing a stable and tamper proof communication between a vehicle and a corresponding vehicle's remote system and/or for providing a stable and tamper proof communication between at least one vehicle related unit and a corresponding vehicle related unit's remote system, wherein the vehicle comprises at least one vehicle located communication node and the vehicle's remote system comprises at least one vehicle's remote system communication node for connecting the vehicle and the vehicle's remote system via a vertical communication connection, and wherein the at least one vehicle related unit comprises at least one vehicle associable communication node and the remote system corresponding to the vehicle related unit comprises at least one remote system communication node for connecting the at least one vehicle related unit and the remote system of the vehicle related unit via another vertical communication connection, the method comprising the steps of:

establishing an on-board connectivity layer comprising the at least one vehicle located communication node and the at least one vehicle associable communication node, the step of establishing the on-board connectivity layer comprising:

i. transmitting by means of an initializing communication node an Invitation Request (IR) for forming the onboard connectivity layer to all communication nodes;

ii. re-transmitting a Response Message (RM) comprising information on an acceptance of the Invitation Request (IR) to the initializing communication node; and iii. transmitting an On-board Connectivity Layer Established Message (OnCLEM) from all on-board connectivity layer communication nodes to their remote system communication nodes;

providing horizontal communication connections between the communication nodes of the on-board connectivity layer; and bypassing a disturbed or interrupted vertical communication connection by using the vertical communication connection of the at least one other communication node of the on-board connectivity layer connected by the horizontal communication connection to the on-board communication node having the disturbed or interrupted vertical default communication connection.

2. Method according to claim 1, wherein step i is performed by transmitting the invitation request (IR) to the communication nodes which are intended to be comprised in the vehicle's on-board connectivity layer and forwarding by means of the receiving on-board communication nodes the Invitation Request (IR) to the remote system communication nodes corresponding to the receiving on-board communication nodes.

3. Method according to claim 1, wherein step ii is performed by retransmitting the response message (RM) to the initializing communication node via the corresponding onboard communication nodes.

4. Method according to claim 1, wherein the method further comprises the step of establishing an off-board connectivity layer comprising the remote system communication nodes.

5. Method according to claim 4, wherein the step for establishing an off-board connectivity layer comprises at least one of the following steps:
  i. Transmitting an Off-board Invitation Request (Off-IR) to all remote system communication nodes;
  ii. Transmitting an Off-board communication setup message (Off-SM) to all remote system communication nodes which are intended to be comprised in the off-board connectivity layer;
  iii. Receiving an Off-board Response Message (Off-RM);
  iv. Transmitting an Off-board Connectivity Layer Established Message (OffCLEM) from all remote system communication nodes to their corresponding on-board connectivity layer communication nodes.

6. Method according to claim 1, wherein the method further comprises the step of exchanging encryption keys (EKM) between the communication nodes.

7. Method according to claim 1, wherein the method further comprises the step of exchanging at least one communication node address (eNA) between the communication nodes.

8. Method according to claim 1, further comprising the step of detecting available communication nodes.

9. Method according to claim 1, further comprising the step of transmitting to all communication nodes data comprising information regarding disturbed or interrupted communication connections.

10. Method according to claim 1, further comprising the step of manually or automatically repeating at least one of the method steps on certain time intervals and/or on a per event basis.

11. Method according to claim 1, further comprising the step of checking and verifying the availability of the communication nodes and/or of the communication connections.

12. Method according to claim 10, further comprising the step of detecting a change in the configuration of the connectivity layers.

13. Method according to claim 12, further comprising the step of reporting a non-authorized change in the configuration of the connectivity layer in case the configurations differ and there is no confirmation of the change.

14. Method according to claim 1, wherein the at least one vehicle communication node is comprised in a truck.

15. Method according to claim 1, wherein the at least one vehicle associable communication node is comprised in a trailer, and/or a cargo, and/or a driver related device, and/or a fifth wheel control unit.

16. Method according to claim 14, wherein the on-board system's and/or the sensor networks comprise at least one integral and/or at least one nomadic device such as a video camera system.

17. Method according to claim 1, wherein the at least one vehicle's remote system communication node is comprised in a back office system of a vehicle company, and the at least one remote system communication node of the vehicle related unit's remote system is comprised in a back office system of a trailer company, and/or a back office of a cargo company, and/or a back office system of an end user, and/or an emergency call centre, and/or a security company.

18. Method according to claim 1, wherein the vertical and/or horizontal communication connection communicate based on a unicast and/or a multicast and/or a broadcast and/or an anycast routing scheme.

19. Method according to claim 1, wherein the vertical and/or horizontal communication connection is bi-directional.

20. Method according to claim 1, wherein the communication connection is an encrypted and/or an authenticated communication connection.

21. Vehicle comprising a vehicle located communication node which is adapted or adaptable to perform a method according to claim 1.

22. Vehicle related unit comprising a vehicle associable communication node which is adapted or adaptable to perform a method according to claim 1, wherein the vehicle related unit is a trailer, a cargo and/or a driver's handheld device.

23. Communication node which is adapted or adaptable to be part of a vehicle and wherein the communication node is further adapted to perform a method according to claim 1.

24. A computer programmed with a computer program comprising a software code adapted or adaptable to perform a method or for use in a method according to claim 1.

25. A non-transitory computer program product stored on a computer readable medium, comprising a software code for use in a method according to claim 1.

* * * * *